(12) United States Patent
Starr

(10) Patent No.: US 10,248,617 B2
(45) Date of Patent: Apr. 2, 2019

(54) FILE-LEVEL ARRAY STORAGE

(71) Applicant: Matthew Thomas Starr, Lafayette, CO (US)

(72) Inventor: Matthew Thomas Starr, Lafayette, CO (US)

(73) Assignee: Spectra Logic, Corp., Boulder, CO (US)

( * ) Notice: Subject to any disclaimer, the term of this patent is extended or adjusted under 35 U.S.C. 154(b) by 48 days.

(21) Appl. No.: 14/977,987

(22) Filed: Dec. 22, 2015

(65) Prior Publication Data

US 2017/0177592 A1 Jun. 22, 2017

(51) Int. Cl.
*G06F 3/00* (2006.01)
*G06F 16/11* (2019.01)
*G06F 3/06* (2006.01)
*G06F 11/00* (2006.01)

(52) U.S. Cl.
CPC .......... *G06F 16/113* (2019.01); *G06F 3/0619* (2013.01); *G06F 3/0647* (2013.01); *G06F 3/0685* (2013.01); *G06F 11/00* (2013.01)

(58) Field of Classification Search
CPC .............................. G06F 16/113; G06F 3/0619

USPC .......................................................... 711/118
See application file for complete search history.

(56) References Cited

U.S. PATENT DOCUMENTS

| | | | |
|---|---|---|---|
| 6,505,216 B1 * | 1/2003 | Schutzman | G06F 11/1456 |
| 7,188,303 B2 | 3/2007 | Schmisseur | |
| 7,467,281 B2 | 12/2008 | Edirisooriya | |
| 7,865,798 B2 | 1/2011 | Pomerantz | |
| 7,945,726 B2 | 5/2011 | Faibish et al. | |
| 8,719,488 B2 | 5/2014 | Maheshwari | |
| 2008/0162811 A1 * | 7/2008 | Steinmetz | G06F 13/4234 711/114 |
| 2009/0089502 A1 * | 4/2009 | Cheng | G06F 11/1076 711/114 |

* cited by examiner

*Primary Examiner* — Jae U Yu
(74) *Attorney, Agent, or Firm* — Kenneth Altshuler

(57) ABSTRACT

An apparatus and associated methodology contemplating an apparatus having a processor-based storage controller. A nontransient, tangible computer memory is configured to store a data file. Computer instructions are stored in the computer memory defining file-level array storage logic that is configured to be executed by the controller to logically containerize the data file in a file-level data set across a plurality of virtual storage containers, and to concurrently flush the virtual storage containers by migrating units of the file-level data set to a plurality of physical storage devices.

14 Claims, 8 Drawing Sheets

FILE-LEVEL ARRAY STORAGE

CROSS-REFERENCE TO RELATED APPLICATIONS

None.

FIELD OF THE INVENTION

The present technology relates generally to deep storage in distributed storage systems.

DESCRIPTION OF RELATED ART

Information and management computer applications are used extensively to track and manage data relevant to an enterprise, such as marketing and sales data, manufacturing data, inventory data, and the like. Typically, the application data resides in a centralized database within a distributed storage system, and in a format such as in Oracle, Informix, or SQL and the like. Local applications integrate remote clients and network servers to use and manage the application data, and to make the application data available to remote applications such as via remote function calls (RFCs).

The centralized location of the application data can be problematic in that it places on the enterprise owner the onus of maintaining complex computer systems in order to support the applications. For example, it has traditionally been necessary for the enterprise owner to acquire the knowledge necessary to purchase and maintain the physical storage devices that store the data. The maintenance includes implementing extensive and complex requirements that protect the stored data from file loss, from storage device failure such as corrupted storage media, and even from entire installation failure. Where just file failure has occurred, it is advantageous to provide an end-user initiated recovery rather than requiring the enterprise owner's participation. When a storage failure requires complete recovery of a file system, preferably removable storage devices store the backups in a way suited for high performance streaming. Worst case, when an entire installation failure requires an offsite recovery, preferably the removable storage devices are ordered in a way making it efficient to remove them to the offsite location.

What is needed is a solution that replaces the complex and expensive archive requirements of the previously attempted solutions with a back-end archive controller having top-level control of removable physical storage devices. It is to that need that the embodiments of the present technology are directed.

SUMMARY OF THE INVENTION

Some embodiments of the claimed technology contemplate an apparatus having a processor-based storage controller. A nontransient, tangible computer memory is configured to store a data file. Computer instructions are stored in the computer memory defining file-level array storage logic that is configured to be executed by the controller to logically containerize the data file in a file-level data set across a plurality of virtual storage containers, and to concurrently flush the virtual storage containers by migrating units of the file-level data set to a plurality of physical storage devices.

Some embodiments of the claimed technology contemplate a method that includes dividing a data file into a plurality of parts; logically containerizing the parts as units in a file-level data set across a plurality of virtual storage containers; and flushing the storage containers concurrently by migrating the units of the file-level data set to a plurality of physical storage devices.

Some embodiments of the claimed technology contemplate an apparatus having a storage controller caching file-level data in a computer memory, and means for striping the cached file-level data across a plurality of physical storage devices with rotating parity.

DETAILED DESCRIPTION

Initially, it is to be appreciated that this disclosure is by way of example only, not by limitation. The data management concepts herein are not limited to use or application with any specific system or method. Thus, although the instrumentalities described herein are for the convenience of explanation, shown and described with respect to exemplary embodiments, it will be appreciated that the principles herein may be applied equally in other types of storage systems and methods involving deep storage of archive data.

Figure 1:
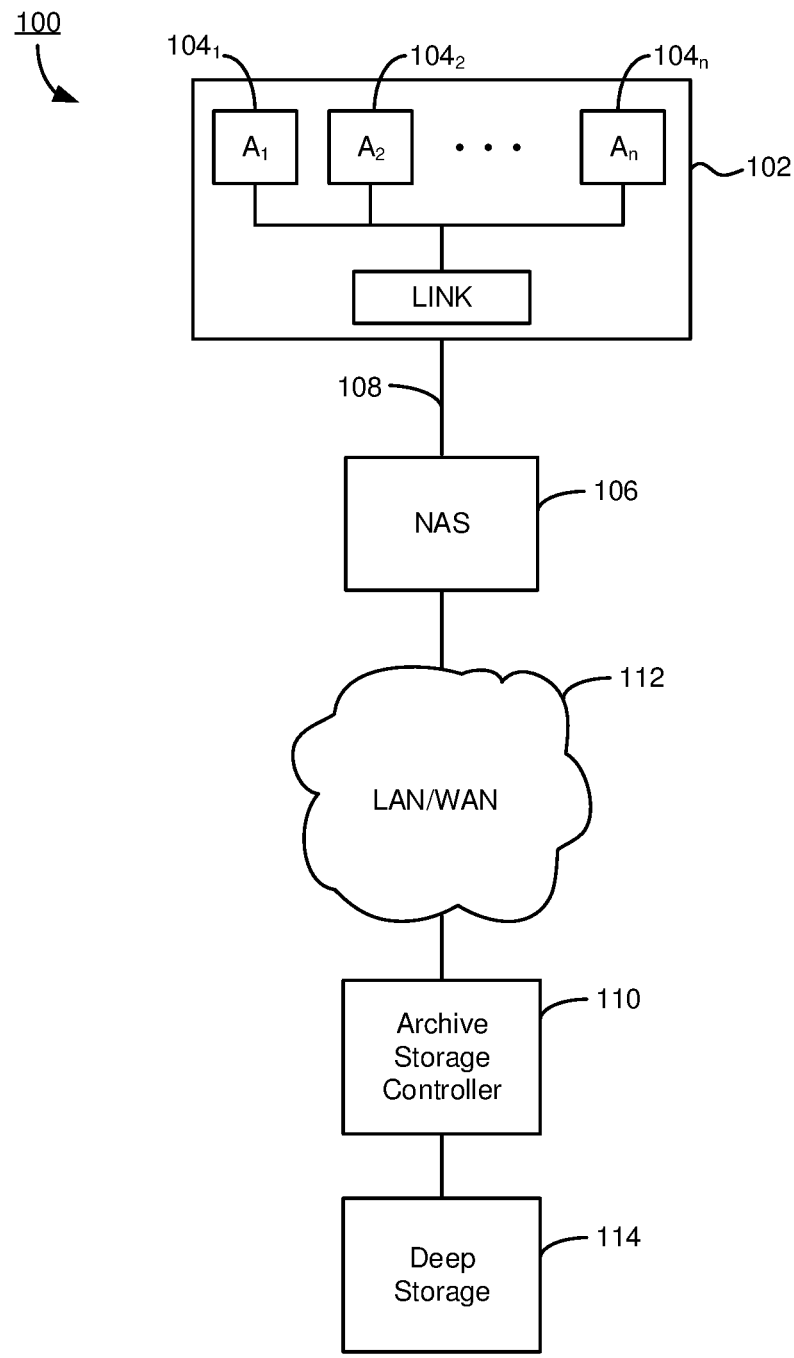
FIG. 1 is a diagrammatic depiction of a distributed data storage system that is constructed in accordance with the present technology.

To illustrate an exemplary environment in which preferred embodiments of the present technology can be advantageously practiced, FIG. 1 is a simplified depiction of an illustrative distributed storage system 100 that includes an enterprise server 102 executing a number of applications 104. The circuitries represented by the block depiction in FIG. 1 and otherwise throughout this description generally can be embodied in a single integrated circuit or can be distributed among a number of discrete circuits as desired.

A detailed description of the computer applications 104 is unnecessary for the skilled artisan to understand the scope of the claimed technology. Generally, the applications 104 can be any type of computer application such as but not limited to a point of sale application, an inventory application, a supply-chain application, a manufacturing application, and the like. The server 102 may communicate with one or more other servers (not depicted) via one or more networks (not depicted). The server 102 in these illustrative embodiments communicates with a network attached storage (NAS) device 106 via a local network 108. The NAS device 106 presents an independent storage file system to the server 102. The server 102 stores application data to and retrieves application data from the NAS device 106 in the normal course of executing the respective applications 104.

Further in these illustrative embodiments the NAS device 106 cooperates with an archive storage controller (ASC) 110 to store copies of the application data for long-term retention in a deep storage system 114. The long-term storage may be provisioned for backup copies (backups) and other data that is subject to retention policies. The NAS device 106 and the ASC 110 communicate via a network 112 that can be characterized as Ethernet based switching network. The protocol utilized by the ASC 110 makes it well suited for placement at a remote site a distance away from the NAS device 106. This protocol is compatible with the Internet and can be run over either private or public ISP networks. The NAS device 106 can execute programmed routines that periodically transfer archive data files to the ASC 110 for the long-term retention. As described in detail herein, deep storage can be managed entirely by applications in the ASC 110, independently of any control by the enterprise server 102.

The ASC 110 can provide a cloud storage compatible interface for copying the file data from the NAS 106 to the ASC 110. For example, a link application in the NAS 106 can send the file data via the network 112 through implementation of representational state transfer (REST) calls from the link module via object-oriented language. A REST architecture, such as the World Wide Web, can transfer data and commands via hypertext transfer protocol (HTTP) commands such as GET, POST, DELETE, PUT, etc. Particularly, the link application can send and receive file data via connection with the ASC 110 configured as an HTTP device. The NAS 106 connection with the ASC 110 is built into the link module so that both sending file data to and receiving file data from the ASC 110 is self-contained and automatically established by the link application when necessary. Generally, the link application can map requests/responses to REST request/response streams to carry out predetermined transfers of file data via object transfers.

Figure 2:
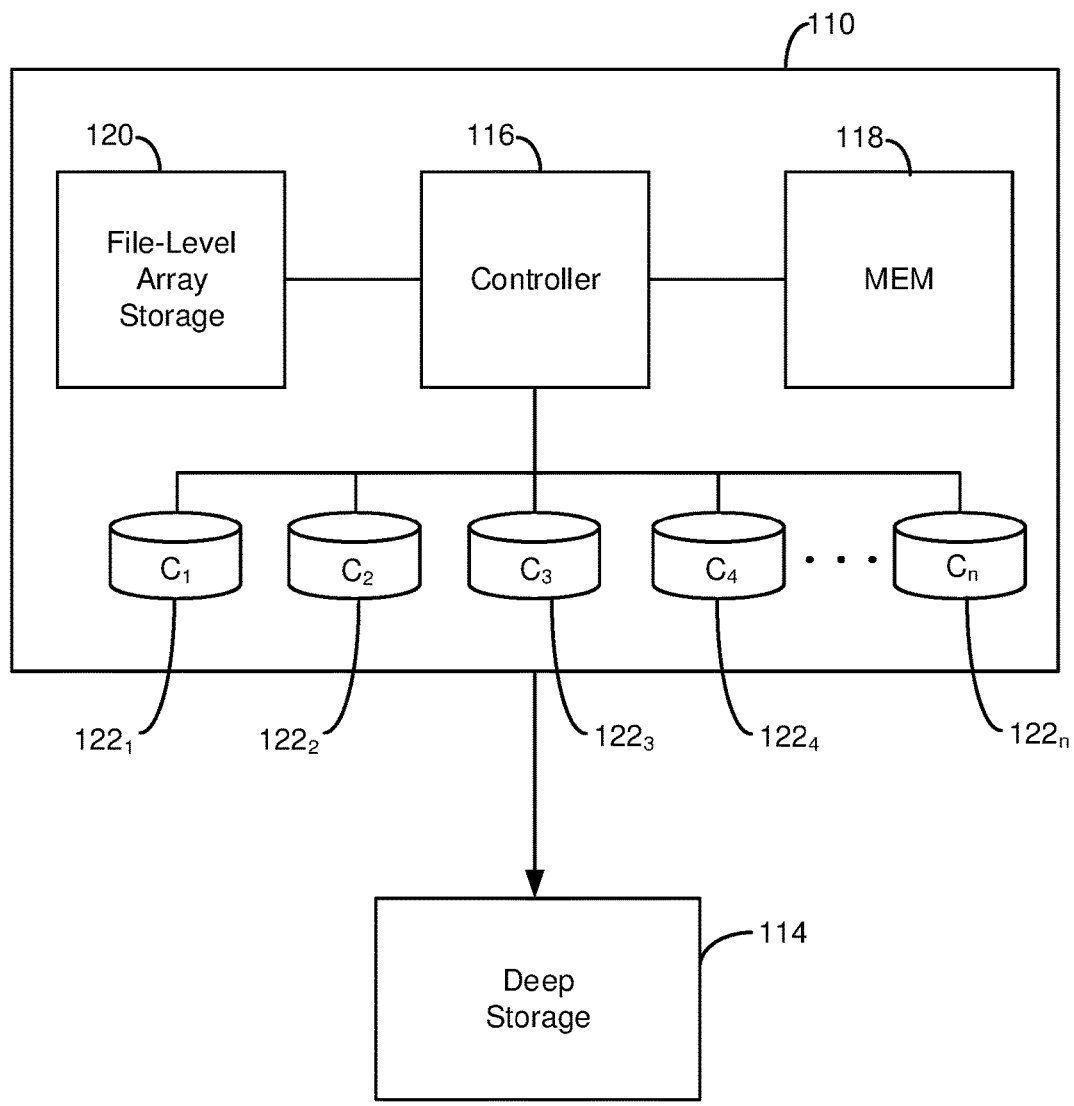
FIG. 2 is a diagrammatic depiction of the archive storage controlled in the system of FIG. 1.

FIG. 2 diagrammatically depicts in these illustrative embodiments the ASC 110 has a processor-based controller 116, preferably a programmable computer processor, providing top-level control in accordance with programming steps and processing data stored in non-volatile memory (such as flash memory or similar) and in dynamic random access memory (DRAM). A memory 118 temporarily stores (buffers) the transferred enterprise file data until such a time that the controller 116 migrates it to deep storage 114. For purposes of this description and meaning of the appended claims, the non-volatile memory, DRAM, and memory 118 are collectively referred to as the computer memory. The memory 118 can include a plurality of storage drives such as hard disk drives (HDDs) or solid-state drives (SSD), or other solid-state memory.

The ASC 110 has a file-level array storage application 120 that executes computer instructions stored in the computer memory to allocate a number of logical volumes 122 for logically arranging the file data temporarily stored in the computer memory. The logical volumes 122 are sometimes referred to herein as storage containers 122 ($C_1, C_2, \ldots C_n$). The number of storage containers 122 is flexible, and will be based on the format of physical storage devices selected in the deep storage 114. Each storage container 122 is only a temporary repository for the file data during the time it is migrated to the deep storage 114.

Figure 3:
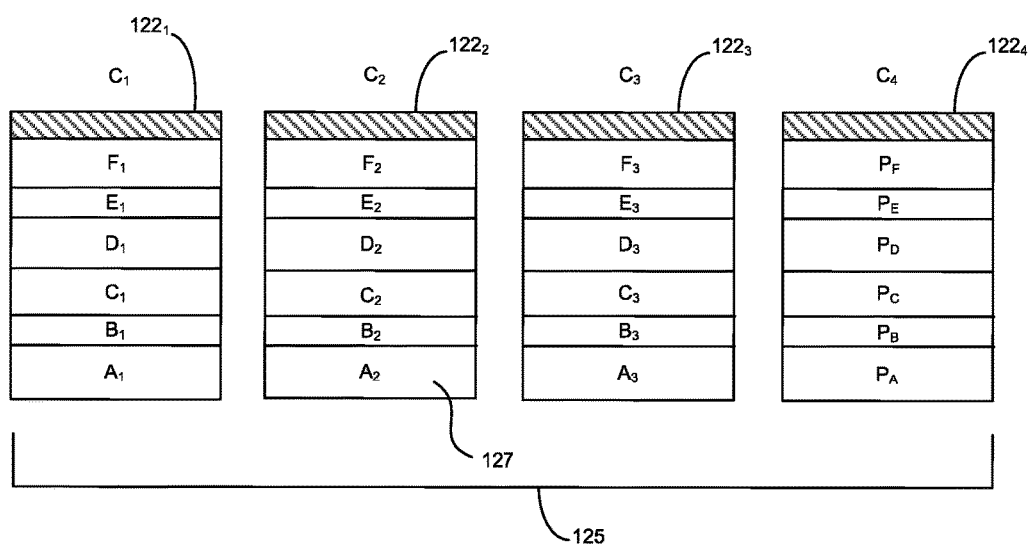
FIG. 3 is a diagrammatic depiction of containerized file-level stripe in accordance with this technology.

FIG. 3 diagrammatically depicts illustrative embodiments in which the controller 116, by executing the file-level array storage logic 120, has allocated four storage containers $122_1$, $122_2$, $122_3$, $122_4$ to temporarily store data files A-F. Generally, the controller 116 logically stripes each buffered file across the storage containers 122. In these illustrative embodiments the file-level data is allocated to three of the containers $122_1$, $122_2$, $122_3$, and parity data for the file-level data is calculated and stored in the other storage container $122_4$. Particularly, in these illustrative embodiments the controller 116 divides a file A into three substantially equal parts $A_1, A_2, A_3$ and allocates three corresponding storage containers $122_1$, $122_2$, $122_3$ to the respective parts. The controller 116 also calculates a parity value $P_A$ for the stripe units $A_1, A_2, A_3$ and allocates the other storage container $122_4$ for the parity. For clarity, in this description and the appended claims a "stripe" 125 means all the file data for a particular file across all the storage containers. For example, the stripe for file A means $A_1, A_2, A_3, P_A$. A "stripe unit" 127 means all the data in one storage container 122 of a stripe; for example, $A_2$ is a stripe unit 127 in the file A stripe.

Although these illustrative embodiments depict the use of distributed parity in the file-level striping, the contemplated embodiments are not so limited. In alternative embodiments other useful redundancy (RAID) methods can be used including dual distributed parity and no parity at all. In all such cases the term "stripe" means all the data in a file and the corresponding parity data, and "stripe unit" means all the data in one container, whether file data or parity data.

In these illustrative embodiments the controller 116 has continued to stripe file-level data across the containers 122 for files B-F. Note that the files are not necessarily the same size, for example, file B requires significantly less allocation than file A. At some advantageous time the controller 116 flushes the data to physical storage devices in deep storage 114. In these embodiments flushing is preferably called for when the containers 122 are substantially full. It is virtually impossible that multiple files will precisely fill the container 122, so a padding file 124 can be allocated for purposes of migrating a complete container 122. The padding file 124 can be written when the unallocated space is less than a predetermined threshold, or when there is insufficient space for allocating the next file, and the like.

Figure 4:
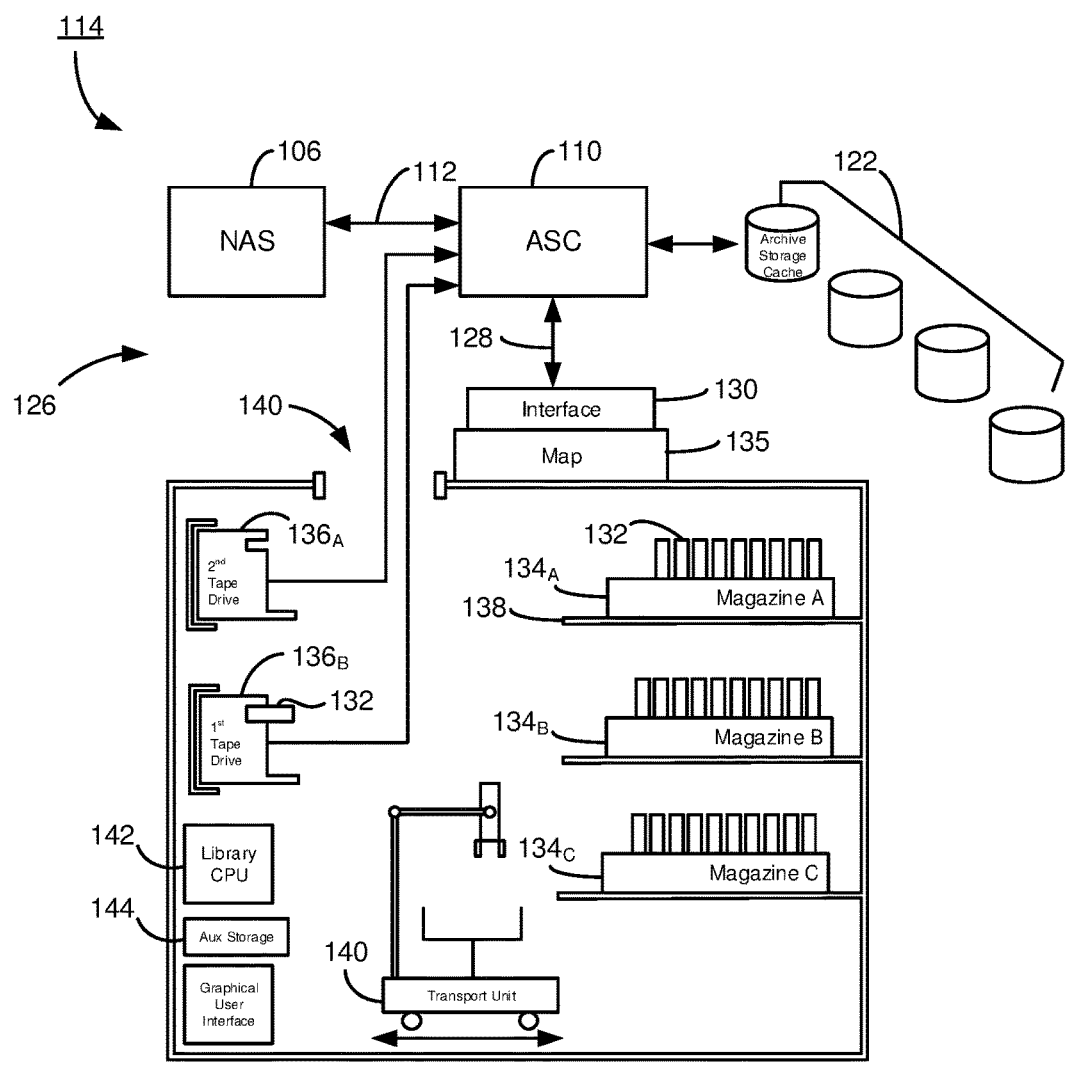
FIG. 4 is a diagrammatic depiction of a tape library used as the deep storage in the system of FIG. 1.

For purposes of continuing the description of these illustrative embodiments, the deep storage 114 (FIG. 1) can be embodied by a tape storage system. FIG. 4 depicts illustrative embodiments of a tape library 126 suited for use with this technology. The tape library 126 communicates with the ASC 110 via a communication path 128 and interface 130. Preferably, the NAS 106 transfers files to the ASC 110 without regard to the ASC 110 operations with the tape library 126. Although the ASC 110 includes computer memory for temporarily storing the files from the NAS 106, it is the ASC 110 alone without communication from the NAS 106 that controls the storage operations of the tape library 126. The tape library 126 is backend bulk storage with a much larger data storage capacity than the ASC 110.

The physical storage devices in the tape library 126 are a plurality of tape cartridges 132 grouped in magazines 134. The tape cartridges 132 can be identified by a computer control that continually tracks the position of each tape cartridge 132, both by magazine and position in the magazine. A particular tape cartridge 132 might be moved to a different position during normal operations of the tape library 126. The tape cartridges 132 can also be physically identified, such as by attaching radio frequency identification (RFID) tags or semiconductor memory devices and the like. By continuously identifying the tape cartridges 132, a selected one can be mounted into one of the tape drives 136 to transfer data to and/or retrieve data from the selected tape cartridge 132. A map module 135 logically maps the physical location of each tape cartridge 132. The logical map is used by the ASC 110 to account for the file data it stores to and retrieves from the tape library 126. In alternative embodiments the physical storage devices can be a different form, such as optical disks, optical disk cartridges, magnetic disks, optical-magnetic disks, mobile solid state memory devices, and the like.

The tape library 126 can have a shelving system 138 for queuing the magazines 134 not presently at a tape drive 136. A transport unit 140 shuttles magazines 134 between the shelving system 138 and the drives 136, and picks and places a particular tape cartridge 132 from a shuttled magazine 134 to/from a drive 136. Although FIG. 4 diagrammatically depicts three magazines 134 of nine tape cartridges 132 each being shuttled to and from two drives 136, that arrangement is merely illustrative and in no way limiting of the claimed embodiments. For example, any number of drives 136 can be provided within the tape library 126 to concurrently engage a like number of tape cartridges 132. Further, two or more tape libraries can communicate with each other by transporting magazines 134 or individual tape cartridges 132 through an access port 140.

Top-level control is provided by a central processor unit (CPU) 142 that has top-level control of all the various components and their functionalities. Data, virtual mappings, executable computer instructions, operating systems, applications, and the like are stored to a memory 144 and accessed by one or more processors in and/or under the control of the CPU 142. The CPU 142 includes macroprocessors, microprocessors, memory, and the like to logically carry out software algorithms and instructions.

As one skilled in the art recognizes, the tape library 126 depicted in FIG. 4 diagrammatically illustrates only major elements of interest for purposes of a general description. As such, certain necessary structures and components are omitted for simplicity sake, the enumeration of such not being necessary for the skilled artisan to readily ascertain the scope of the claimed subject matter. For example, it will be understood that the tape library 126 includes all of the necessary wiring, user interfaces, plugs, modular components, entry and exit port(s) to introduce (or remove) removable storage elements, fault protectors, power supplies, processors, busses, robotic transport unit tracks, indication lights, and so on, in order to carry out the function of a tape library.

Figure 5:
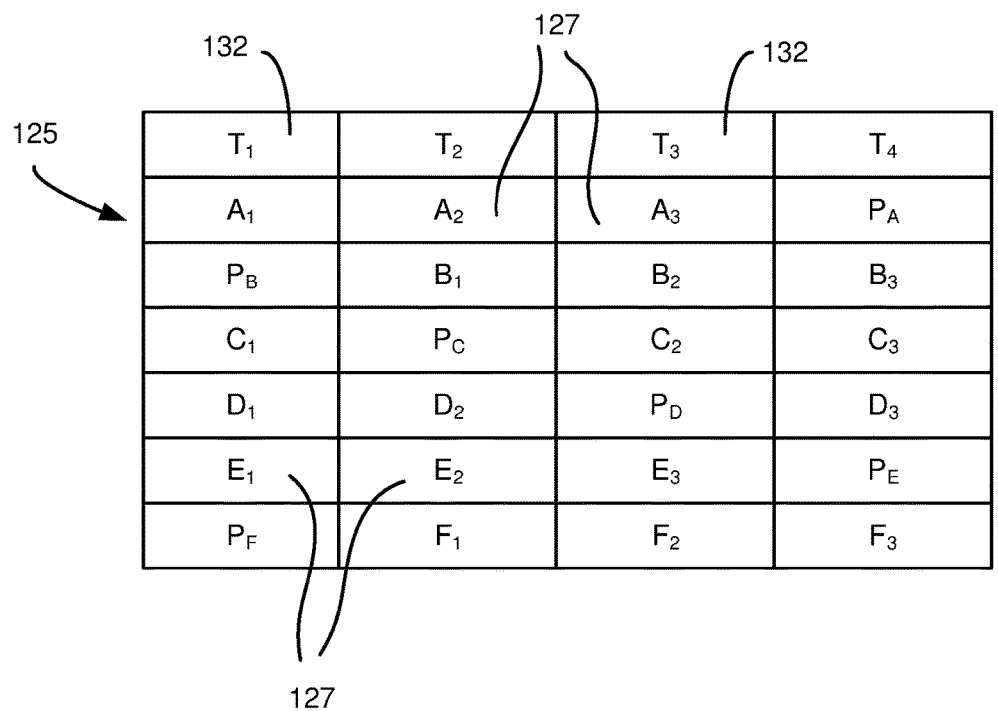
FIG. 5 is a map of the containerized file-level stripes in FIG. 3 in the physical storage devices in the tape library of FIG. 4.

FIG. 5 is a predetermined array map used by the ASC 110 executing the file-level array storage logic 120 to flush the containers 122 by migrating the file-level stripe units 127 (FIG. 3) to four tape cartridges 132 ($T_1$, $T_2$, $T_3$, $T_4$). The stripe units 127 are striped across the tape cartridges 132 with the parity data rotating among the four tape cartridges 132. That is, in the file A stripe $125_A$ the parity data $P_A$ is stored to the tape cartridge $132_4$, whereas in the file B stripe $125_B$ the parity data $P_B$ is rotated to the tape cartridge $132_1$, and so on.

Figure 6:
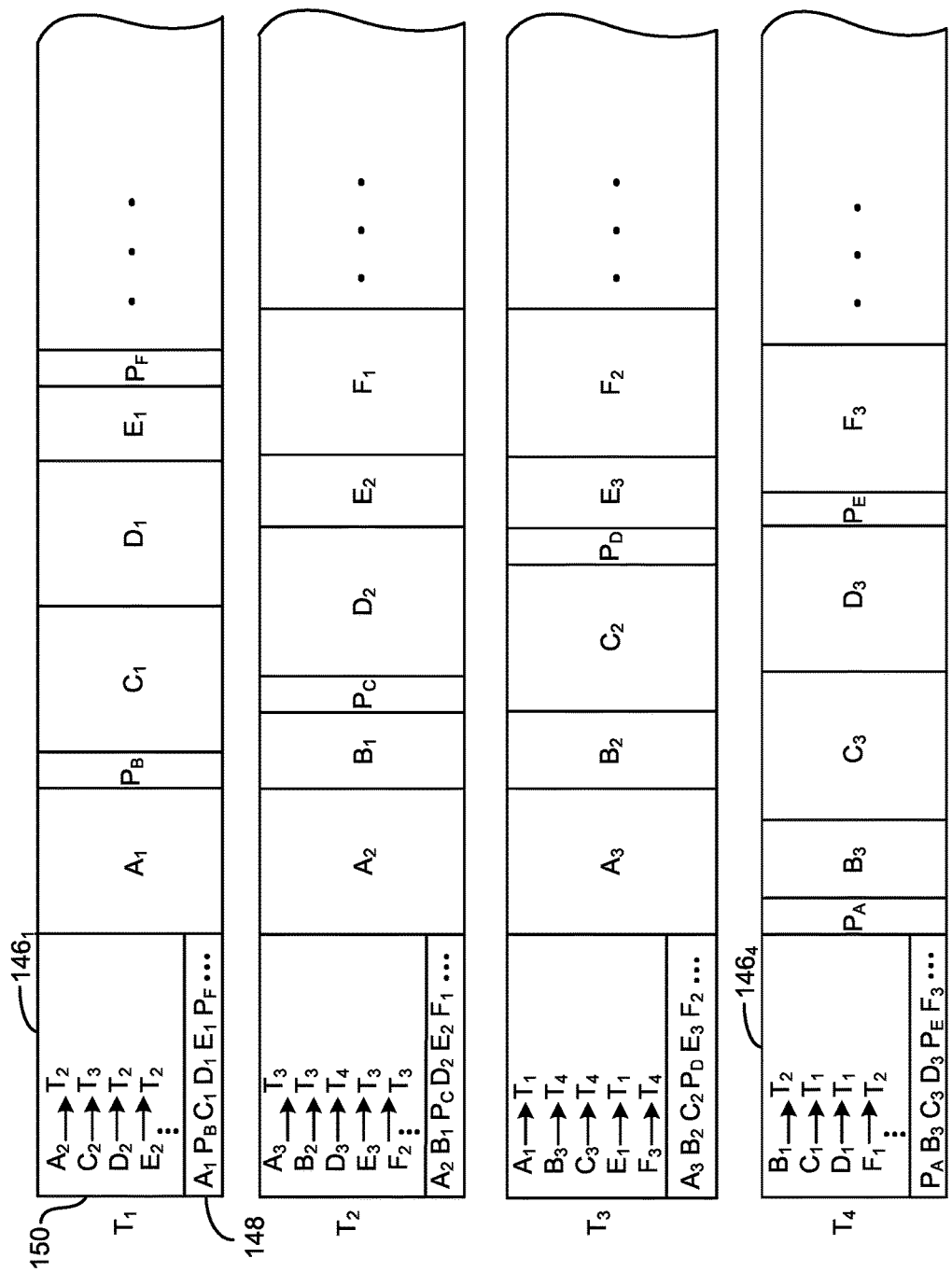
FIG. 6 is a diagrammatic depiction of the file-level stripe units stored in the tapes in the library of FIG. 4.

FIG. 6 diagrammatically depicts the four tape cartridges $132_1$-$132_4$ having the stripe units 127 migrated thereto in accordance with the map depicted in FIG. 5. Each tape cartridge 132 can be formatted to include an index 146 containing information about the file-level data and parity data stored on the respective tape cartridge 132. For example, the index $146_1$ includes a searchable table 148 of all the data stored on the respective tape cartridge $132_1$. The index $146_1$ can also include a data structure 150, such as a linked list, that identifies where the next sequential stripe unit 127 is located for each stripe unit 127 stored on the respective tape cartridge $132_1$. For example, the data structure $150_1$ indicates that for the $A_1$ stripe unit stored on the first tape cartridge $132_1$, the next sequential stripe unit $A_2$ is stored on the second tape cartridge $132_2$ ($T_2$).

Figure 7:
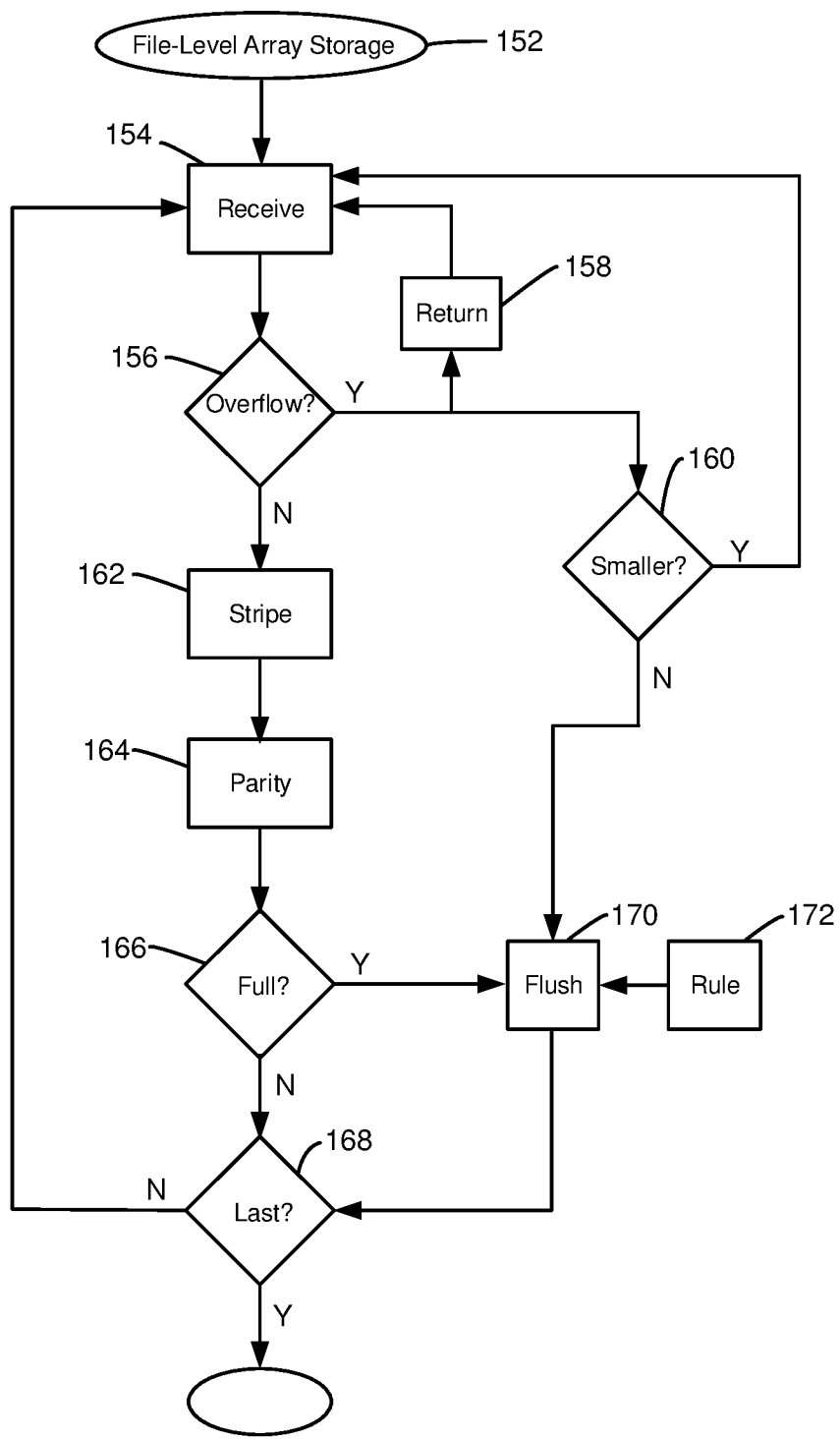
FIG. 7 is a flowchart of steps in a method for FILE-LEVEL ARRAY STORAGE in accordance with this technology.

FIG. 7 is a flowchart depicting steps in a process 152 for FILE-LEVEL ARRAY STORAGE in accordance with illustrative embodiments of this technology. The process is embodied in computer instructions stored in memory forming the file-level array storage logic (FIG. 2) that is executed by the controller in order to containerize files as depicted in FIG. 3 and store the files to physical storage devices as depicted in FIG. 6.

The process begins in step 154 with the ASC receiving a file that was transferred by the NAS. In block 156 it is determined whether the most recent file overflows the containers. Referring to FIG. 3 for example, this step determines whether there is enough storage capacity in the containers to store the next file G. If file G is a relatively large file, such as file A, then there is not enough storage container capacity to store file G, so attempting to do so would overflow the storage containers. If the determination of block 156 is "yes," then block 158 returns control of the most recent file to block 154 where it is held pending until the storage containers are flushed to provide adequate storage capacity for that file. In block 160 it is determined whether there is a pending file in block 154 that would not overflow the storage containers. If the determination of block 160 is "yes," then control returns to block 154 where that smaller pending file is selected as the next file for processing.

If, on the other hand, the determination of block 156 is "no," then control passes to block 162 where the controller divides the file and stripes the file across all but one of the storage containers. In block 164 parity for the file stripe is calculated and stored in the other storage container completing the stripe.

In block 166 it is determined whether the storage containers are full after storing the most recently striped file. A "full" determination can be made if the remaining storage container capacity is less than a predetermined threshold value. If the determination of block 166 is "no," then control passes to block 168.

If the determination of block 160 is "no" or the determination of block 166 is "yes," then control passes to block 170 where the containers are flushed by migrating the containerized stripes to the physical storage devices. That migration is controlled by stripe wrapping rules from block 172, such as the rotating parity rule described above.

Finally, in block 168 it is determined whether the last file in block 154 has been processed. If the determination of block 168 is "no," then control returns to block 154 and the process is repeated for the next pending file. If the determination of block 168 is "yes," then the process ends.

Figure 8:
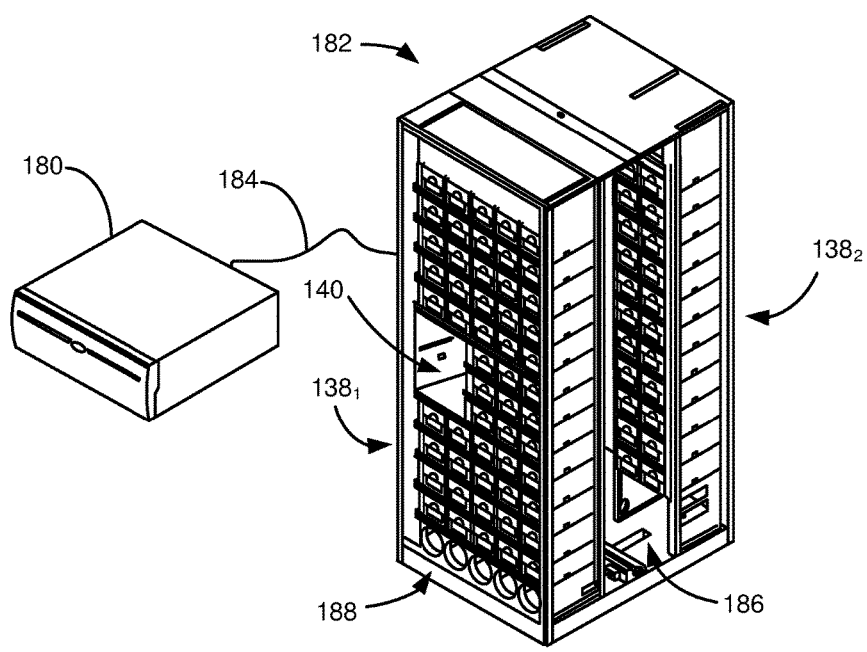
FIG. 8 is an isometric depiction of illustrated embodiments of the tape library of FIG. 4.

Embodiments of the present invention can be commercially practiced in a Black Pearl archive storage system that possesses a Spectra Logic T-Finity tape cartridge library on the backend manufactured by Spectra Logic of Boulder, Co. FIG. 8 shows a commercial embodiment of one Black Pearl archive storage system 180 communicatively linked with the T-Finity unit 182 via a cable 184. The T-Finity unit 182 is depicted without an enclosure. The T-Finity unit 182 as depicted as a single cabinet, but in alternative embodiments multiple cabinets can be combined as necessary to make an expanded tape library or to expand an existing tape library. The Black Pearl archive storage system 180 possesses the ASC (not depicted) and computer memory (not shown) and software that facilitates receiving file-level data from a server (not shown), caching that file-level data in the computer memory, and storing that file-level data to tape cartridges in the T-Finity library 182. The Black Pearl archive storage system 180 is capable of handling all tape related storage commands without the server's involvement. The T-Finity unit 182 comprises a first and second shelf system $138_1$, $138_2$ that are adapted to support a plurality of tape cartridge magazines 134 in these illustrative embodiments. The second shelf system $138_2$ has at least one tape drive (not depicted) adapted to read and write data to and from a tape cartridge. Functionally interposed between the first and second shelf system $138_1$, $138_2$ is a magazine transport space 186. The magazine transport space 186 provides adequate space for a tape cartridge magazine (not depicted) to be moved, via a magazine transport (not depicted), from a position in the shelf system $138_1$, $138_2$ to a tape drive (not depicted). Tape cartridge magazines 134 can be transferred into and out from the T-Finity library via the entry/exit port 140. The T-Finity tape library 182 includes a means for cooling as shown by the fans 188 located at the base.

It is to be understood that even though numerous characteristics and advantages of various embodiments of the present technology have been set forth in the foregoing description, together with the details of the structure and function of various embodiments of the invention, this disclosure is illustrative only, and changes may be made in detail, especially in matters of structure and arrangement of parts within the principles of the present technology to the full extent indicated by the broad general meaning of the terms in which the appended claims are expressed. For example, the disclosed technology can be employed across multiple library partitions, while still maintaining substantially the same functionality and without departing from the scope of the claimed technology. Further, though communication is described herein as between an ASC and a tape library, communication can be received directly by a tape drive, via the interface device 154, for example, without departing from the scope of the claimed technology. Further, although the preferred embodiments described herein are directed to tape library systems, and related technology, it will be appreciated by those skilled in the art that the claimed technology can be applied to other physical storage systems, such as storage drive arrays, without departing from the scope of the claimed technology.

It will be clear that the claimed technology is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed technology disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed:

1. A data file storage apparatus that stores a plurality of different-sized data files in a file-level array, the apparatus comprising:
    a processor-based storage controller;
    a nontransient, tangible computer memory configured to store the data files; and
    computer instructions stored in the computer memory defining file-level array storage logic that is configured to be executed by the controller to logically containerize each data file in respective stripe units forming a file-level data set across a plurality of virtual storage containers, each data file's stripe units individually sized by dividing the respective data file size by the number of virtual storage containers, and to concurrently flush the virtual storage containers by migrating the stripe units of each file-level data set to a plurality of physical storage devices.

2. The apparatus of claim 1 wherein the file-level array storage logic is configured to calculate parity data for the file-level stripe units.

3. The apparatus of claim 2 wherein the file-level array storage logic is configured to migrate the file-level data sets to the physical storage devices with rotating parity.

4. The apparatus of claim 3 wherein the file-level array storage logic is configured to construct a padding file sized so that the plurality of file-level stripe units in a container combined with the padding file fills the storage container in relation to a predetermined threshold size.

5. The apparatus of claim 3 comprising a pointer in a digital index in one of the physical storage devices that identifies a location of a file-level stripe unit stored in a different physical storage device.

6. The apparatus of claim 5 wherein the pointer is included in a linked list.

7. The apparatus of claim 1 comprising a plurality of file-level stripe units filling a first storage container in relation to a predetermined threshold size, a plurality of file-level stripe units filling a second storage container, and a plurality of parity data for the file stripe units in a third storage container, wherein the file-level array storage logic is configured to concurrently flush the entire contents of the first, second, and third storage containers to the physical storage devices.

8. The apparatus of claim 1 wherein the number of virtual storage containers and the number of physical storage devices are the same.

9. A method for storing a plurality of different-size data files in a file-level array, the method comprising:
    dividing each data file into a plurality of stripe units that are sized by dividing the respective data file size by a predetermined plurality of virtual storage containers;
    logically containerizing the stripe units in file-level data sets across the plurality of virtual storage containers; and
    flushing the storage containers concurrently by migrating the stripe units of each file-level data set to a plurality of physical storage devices.

10. The method of claim 9 comprising calculating parity for the file-level stripe units.

11. The method of claim 10 wherein the flushing step comprises migrating the file-level stripes to the physical storage devices with rotating parity.

12. The method of claim 11 wherein the containerizing comprises storing a padding file in the first storage container so that a plurality of file data stripe units in the first storage container and the padding file fill the first storage container in relation to a predetermined threshold size.

13. The method of claim 12 comprising digitally pointing from one of the physical storage devices to a location of a file-level stripe unit in another physical storage unit.

14. The method of claim 13 comprising striping a plurality of file-level stripe units and a padding file to fill a first storage container in relation to a predetermined threshold size, striping a plurality of file-level stripe units and a padding file to fill a second storage container in relation to the predetermined threshold size, and concurrently flushing the entire contents of the storage containers to the physical storage devices.

\* \* \* \* \*